(12) United States Patent
Atluri et al.

(10) Patent No.: US 11,603,005 B2
(45) Date of Patent: Mar. 14, 2023

(54) APPARATUS AND METHOD OF QUICK CHARGING AN ELECTRIC VEHICLE

(71) Applicant: GM Global Technology Operations LLC, Detroit, MI (US)

(72) Inventors: Venkata Prasad Atluri, Novi, MI (US); Hanho Yun, Oakland Township, MI (US); Chandra S. Namuduri, Troy, MI (US); Madhusudan Raghavan, West Bloomfield, MI (US); Venkatesh Gopalakrishnan, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 268 days.

(21) Appl. No.: 17/037,974

(22) Filed: Sep. 30, 2020

(65) Prior Publication Data

US 2022/0097540 A1   Mar. 31, 2022

(51) Int. Cl.
*B60L 53/16* (2019.01)
*H02J 7/00* (2006.01)
*B60L 53/66* (2019.01)
*H02M 3/158* (2006.01)

(52) U.S. Cl.
CPC ............. *B60L 53/16* (2019.02); *B60L 53/665* (2019.02); *H02J 7/007* (2013.01); *H02M 3/1582* (2013.01); *B60L 2210/12* (2013.01); *H02J 2207/20* (2020.01)

(58) Field of Classification Search
CPC ........ B60L 53/16; B60L 53/665; B60L 53/66; B60L 2210/12; H02J 7/00; H02J 7/007; H02J 2207/20; H02M 3/158; H02M 3/1582
USPC .................................................. 320/109, 105
See application file for complete search history.

(56) References Cited

U.S. PATENT DOCUMENTS

| 8,963,481 | B2 * | 2/2015 | Prosser ................... B60L 53/00 320/105 |
| 11,374,429 | B2 * | 6/2022 | Wood ....................... H02J 1/122 |
| 2017/0259683 | A1 * | 9/2017 | Shimizu ................... B60L 53/64 |
| 2019/0009679 | A1 * | 1/2019 | Gaither ................. B60L 53/665 |
| 2019/0212167 | A1 * | 7/2019 | Yamada ............. G01C 21/3602 |
| 2021/0394641 | A1 * | 12/2021 | Maeda .................... B60L 53/62 |
| 2022/0069611 | A1 * | 3/2022 | Harris ................... B60L 53/305 |

FOREIGN PATENT DOCUMENTS

JP          2012200043 A  * 10/2012

* cited by examiner

*Primary Examiner* — Richard V Muralidar
(74) *Attorney, Agent, or Firm* — Vivacqua Crane PLLC

(57) ABSTRACT

An apparatus for charging an electric vehicle includes a plug command center having data identifying an availability of an amount of energy which is available for transfer from a first battery system of a first battery electric vehicle (BEV) to a second BEV. A charging adapter provides for energy transfer between a first plug of the first BEV and a second plug of the second BEV. A V2V charging controller communicates data identifying a battery system charge state of the first BEV and a battery system charge state of the second BEV and selects between multiple available charging options.

20 Claims, 3 Drawing Sheets

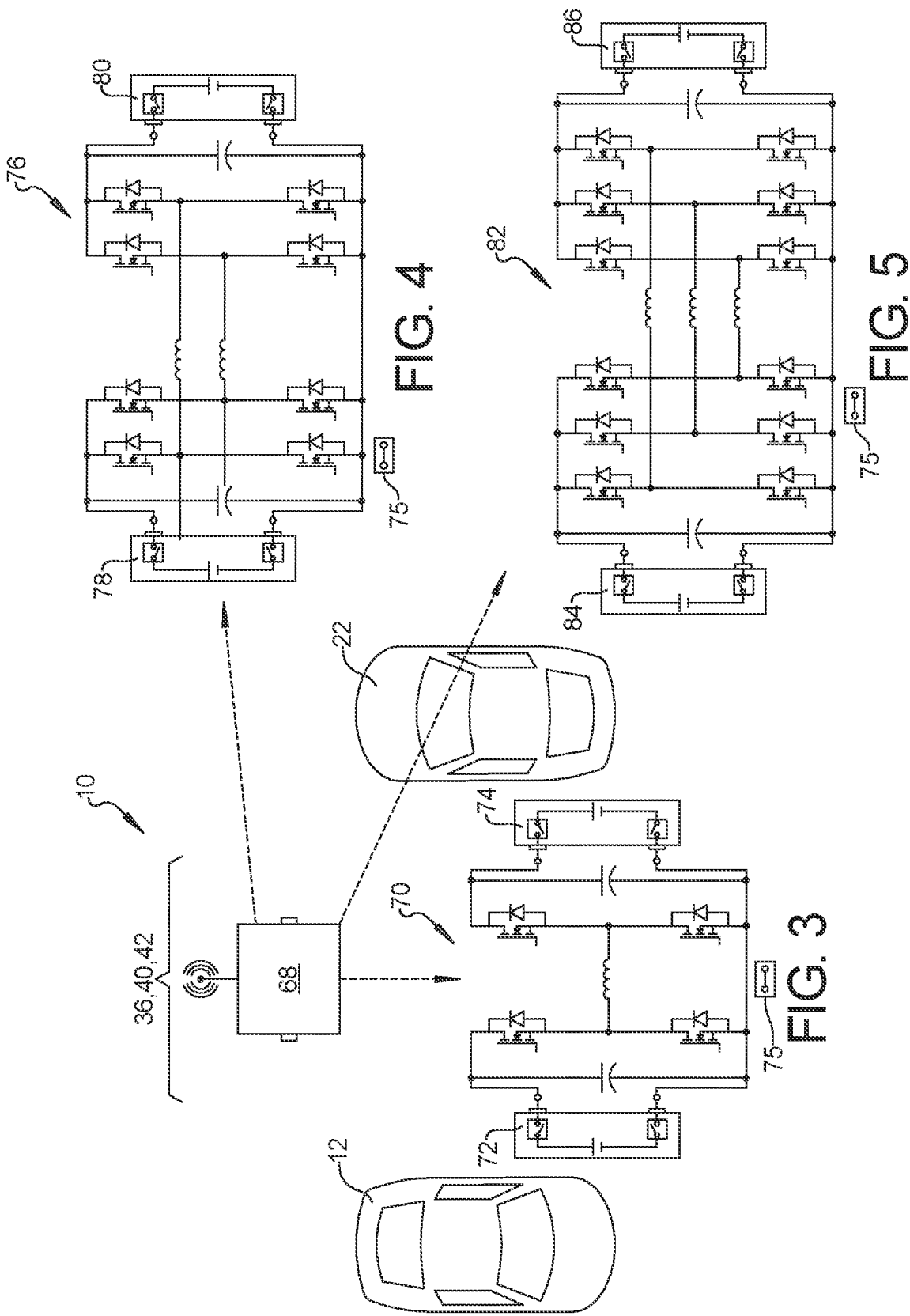

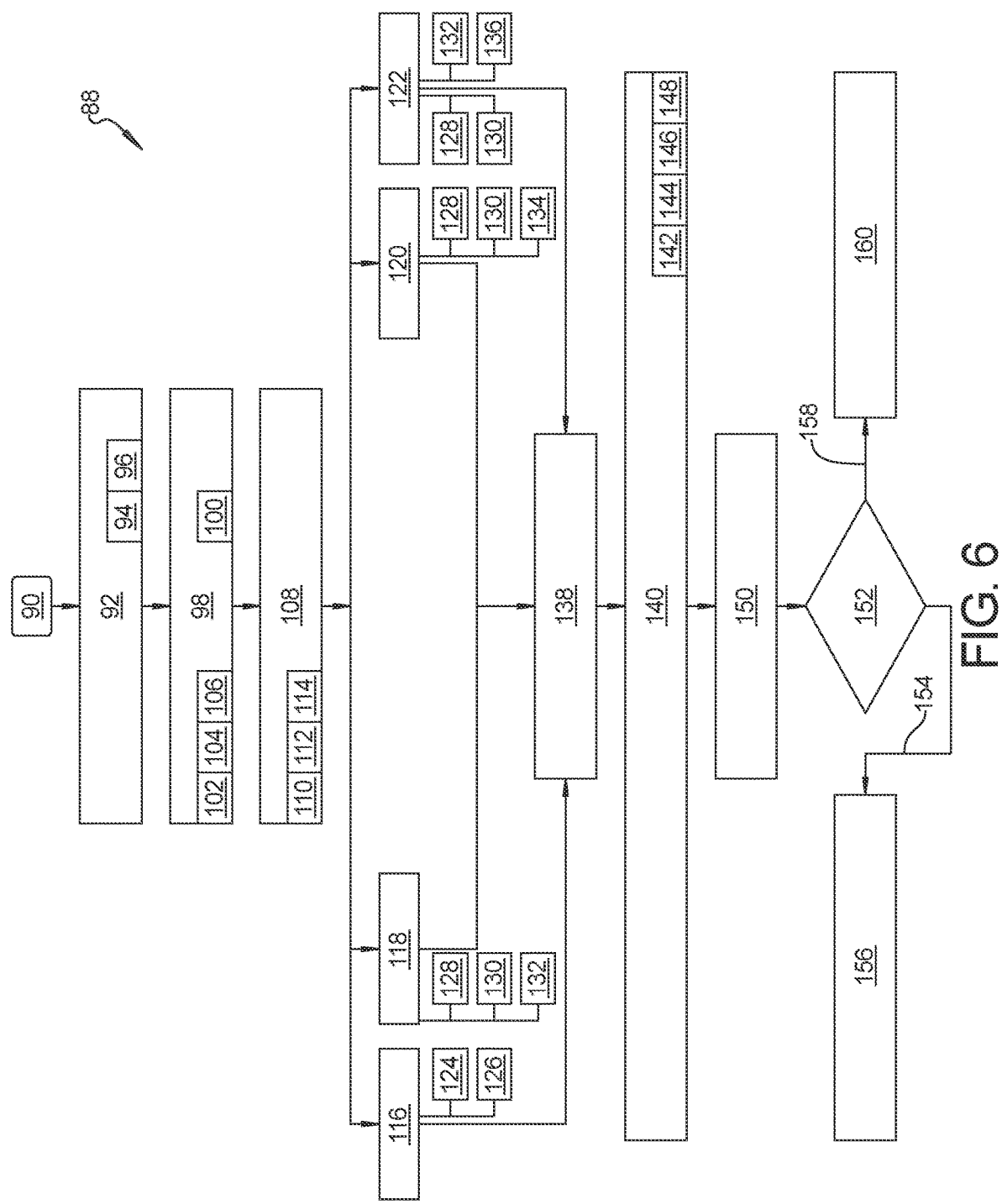

APPARATUS AND METHOD OF QUICK CHARGING AN ELECTRIC VEHICLE

INTRODUCTION

The present disclosure relates to battery charging systems for electrically powered automobile vehicles.

Battery electric vehicles (BEVs) require periodic recharging of the battery packs of the vehicles. The process of recharging may commonly require eight to twenty-four hours. Rapid charging systems have therefore been developed to reduce the charging time, to at least provide a substantial recharge in a time of less than one hour. The quantity and availability of charging stations and the distance between charging stations continues to be a limitation to the demand for BEVs. Range/charge anxiety of BEV customers is therefore hindering the widespread adoption of BEVs.

Although long-range BEVs address these challenges, supporting charging infrastructure is critical in marketing BEVs to potential customers. Public DC fast charging (DCFC) stations can address long range issues but their installations are not widespread. Building the DCFC network is very capital intensive with poor utilization of the charging station.

Thus, while current BEV charging capabilities achieve their intended purpose, there is a need for a new and improved system and method for charging an electric vehicle.

SUMMARY

According to several aspects, an apparatus for charging an electric vehicle includes a plug command center located in a cloud including application software and having data having data identifying an availability of an amount of energy which is available for transfer from a first battery system of a first battery electric vehicle (BEV) to a second BEV. A charging adapter provides for energy transfer between a first plug of the first BEV and a second plug of the second BEV. A vehicle-to-vehicle (V2V) charging controller having charge management algorithms is integrated either with a dc-dc converter or in an automobile vehicle. The V2V charging controller communicates data identifying a first battery system charge state of the first BEV and a second battery system charge state of the second BEV and selects between multiple available charging options.

In another aspect of the present disclosure, the multiple available charging options include a quick-plug dispenser option connecting the first BEV and the second BEV to a quick-plug dispenser, the quick-plug dispenser provided in a charging junction box or in a dispenser having a cable upon request for a predetermined amount per hour or per day.

In another aspect of the present disclosure, for the quick-plug dispenser option a number of available charging plugs is identified and a quantity of charging slots available is identified.

In another aspect of the present disclosure, the multiple charging options include a customer-to-customer option for directly connecting the first BEV to the second BEV using a charging adapter defining a charging cable with a compact dc-dc converter provided by one of the first BEV or the second BEV connected between a first battery system of the first BEV and a second battery system of the second BEV.

In another aspect of the present disclosure, the customer-to-customer option further includes a location of the second vehicle relative to a location of one or more available charge available vehicles including the first BEV and a battery status of the charge available vehicles.

In another aspect of the present disclosure, control equipment of the charging adapter provided with one of the first BEV or the second BEV controls an energy transfer until a full amount of a requested energy level is transferred from the first BEV to the second BEV.

In another aspect of the present disclosure, the multiple charging options include a customer-to-business option identifying a location of the second BEV relative to a location of one or more available charge available vehicles including the first BEV and identifying a business energy need.

In another aspect of the present disclosure, the multiple charging options include a business-to-customer option including a location of the second BEV relative to a location of one or more available charge available vehicles including the first BEV, a battery status of the charge available vehicles, and a target price of the available energy.

In another aspect of the present disclosure, the charging adapter defines a bi-directional buck boost converter matching an electrical system voltage and a battery power of the first BEV to an electrical system voltage and a battery power of the second BEV.

In another aspect of the present disclosure, the V2V charging controller is adapted for an operational voltage range between 150 VDC up to approximately 1200 VDC and includes charging controls and one of: a single-phase V2V bi-directional converter; a two-phase V2V bi-directional converter; and a multiple-phase V2V bi-directional converter which may define a three-phase V2V bi-directional converter.

According to several aspects, an apparatus for charging an electric vehicle includes a charging adapter providing energy transfer by a first plug connected to an energy supplying vehicle and a second plug connected to an energy receiving vehicle. A bi-directional buck boost converter matches an electrical system voltage and a battery power of the energy supplying vehicle to an electrical system voltage and a battery power of the energy receiving vehicle. A controller communicates between the first plug and the second plug and selects between multiple available charging options. The charging adapter includes: a first energy transfer cable pair connected to the first plug and to the bi-directional buck boost converter; and a second energy transfer cable pair connecting the bi-directional buck boost converter to the second plug.

In another aspect of the present disclosure, a communication link connects the first plug to the controller. A vehicle-to-vehicle link connects the controller to the second plug. A plug command center provides processing capability to identify an optimal energy source for the energy receiving vehicle based on a target price of an amount of energy available from the energy supplying vehicle and an energy receiving vehicle available charging time. The controller monitors an energy analysis and controls energy transfer between the energy supplying vehicle and the energy receiving vehicle.

In another aspect of the present disclosure, a first vehicle position defining a GPS coordinate position of the energy supplying vehicle is automatically communicated to the plug command center. A low-energy state in a battery system of the energy receiving vehicle is pinged by the energy receiving vehicle to the plug command center. A second vehicle position defining a GPS coordinate position of the energy receiving vehicle is automatically communicated to the plug command center.

In another aspect of the present disclosure, an optimum common location is calculated for the energy supplying vehicle and the energy receiving vehicle. The optimum common location is calculated by the plug command center using the first vehicle position and the second vehicle position. The plug command center further directs the energy supplying vehicle and the energy receiving vehicle to the common location.

In another aspect of the present disclosure, the energy supplying vehicle includes a first battery system. The energy receiving vehicle includes a second battery system. The charging adapter is connected between the first battery system of the energy supplying vehicle and the second battery system of the energy receiving vehicle at the common location.

In another aspect of the present disclosure, the multiple available charging options include a quick-plug dispenser option connecting the energy supplying vehicle and the energy receiving vehicle to a quick-plug dispenser. A customer-to-customer option using a cable provided by one of the energy supplying vehicle or the energy receiving vehicle is connected between a first battery system of the energy supplying vehicle and a second battery system of the energy receiving vehicle. A customer-to-business option identifies a location of the energy receiving vehicle relative to a location of one or more available charge available vehicles including the energy supplying vehicle and identifies a business energy need. A business-to-customer option includes the location of the energy receiving vehicle relative to the location of one or more available charge available vehicles including the energy supplying vehicle, a battery status of the charge available vehicles, and a target price of an amount of energy available from individual ones of the one or more available charge available vehicles. A payment is electronically processed after completion of the energy transfer from funds in an energy receiving vehicle predetermined account to an energy supplying vehicle predetermined account.

In another aspect of the present disclosure, the bi-directional buck boost converter defines a vehicle-to-vehicle (V2V) bidirectional buck boost converter having a plurality of phases that generate interleaved currents thereby reducing filtering requirements.

According to several aspects, a method for charging an electric vehicle, comprises: identifying an availability of an amount of energy available for transfer from a first battery system of a first battery electric vehicle (BEV) to a second BEV using a plug command center having data; providing for energy transfer between a first plug of the first BEV and a second plug of the second BEV using a charging adapter; communicating data identifying a battery system charge state of the first BEV and a battery system charge state of the second BEV using a V2V charging controller; and selecting between multiple available charging options.

In another aspect of the present disclosure, the method further includes operating the plug command center and: calculating an optimum common location for the first BEV and the second BEV using the first vehicle position and the second vehicle position; and directing the first BEV and the second BEV to the common location.

In another aspect of the present disclosure, the method further includes performing one of: connecting the first BEV and the second BEV to a quick-plug dispenser; and connecting the first BEV to the second BEV using a jumper cable provided by one of the first BEV or the second BEV; and matching an electrical system voltage and a battery power of the first BEV to an electrical system voltage and a battery power of the second BEV using a bi-directional buck boost converter.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a schematic of a single-phase converter for the apparatus of FIG. 1;

FIG. 4 is a schematic of a two-phase converter the apparatus of FIG. 1;

FIG. 5 is a schematic of a multiple-phase converter for the apparatus of FIG. 1; and FIG. 6 is flow diagram of method steps for operating the apparatus of FIG. 1.

DETAILED DESCRIPTION

The following description is merely exemplary in nature and is not intended to limit the present disclosure, application, or uses.

Figure 1:
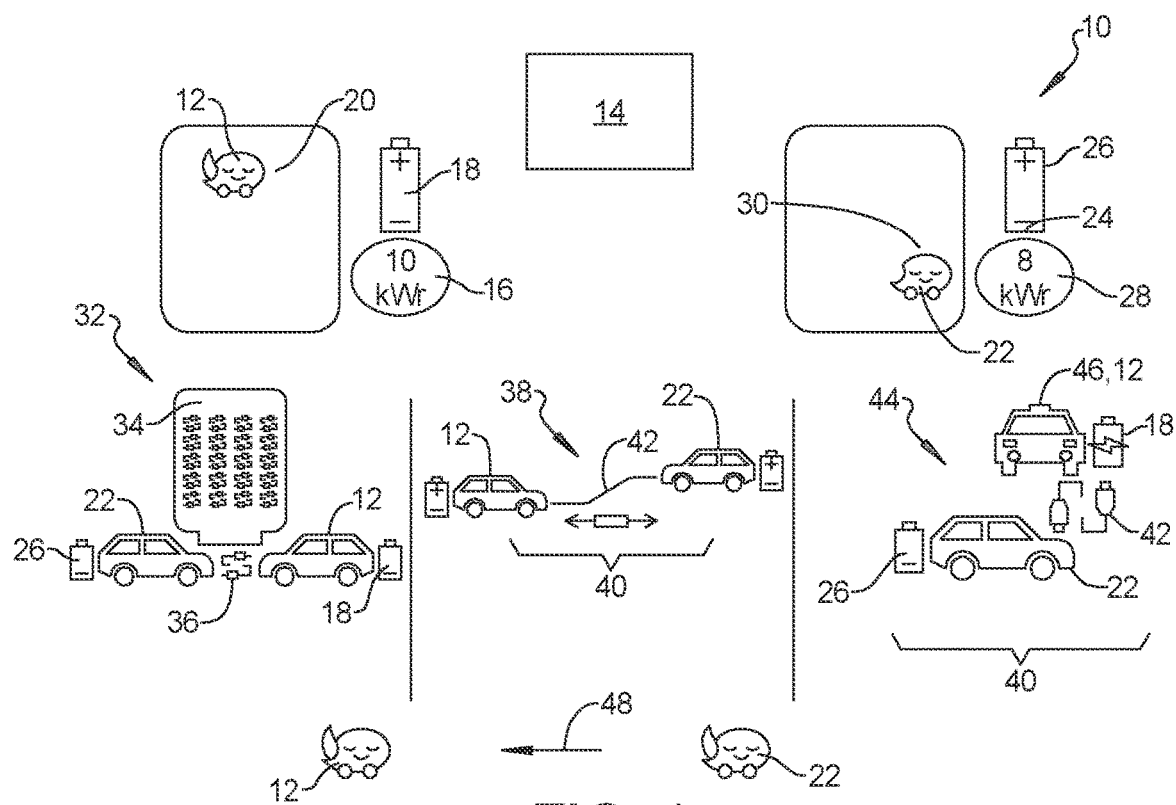
FIG. 1 is a diagrammatic view of an apparatus and method for charging an electric vehicle according to an exemplary aspect.

Referring to FIG. 1, an apparatus and method for charging an electric vehicle 10 provides a two-way technology platform to facilitate charging of a battery electric vehicle (BEV) from multiple different charging sources. Initially, in a first step a first BEV 12 pings a plug command center 14 with data identifying the availability of an amount of energy 16 which is available for transfer from a first battery system 18 of the first BEV 12 to another BEV. For example, the amount of energy 16 may be approximately 10 kWh. A first vehicle position 20, for example a GPS coordinate position of the first BEV 12, is also automatically communicated to the plug command center 14.

Also during the first step a second BEV 22 also pings the plug command center 14 and identifies the second BEV 22 has a low energy state 24 in a second battery system 26 of the second BEV 22. A requested energy level 28 necessary to complete travel to a predetermined destination for the second BEV 22 is also communicated. For example, the requested energy level 28 may be approximately 8 kWh. A second vehicle position 30, for example a GPS coordinate position of the second BEV 22, is also automatically communicated to the plug command center 14.

Upon receipt of the above data, in a second step the plug command center 14 identifies which one of three charging operations provides an optimum operation for transferring the amount of energy 16 which is available from the first BEV 12 to the second BEV 22.

As a first option a first charging operation 32 is performed by initially directing both the first BEV 12 and the second BEV 22 to a quick-plug station 34. The quick-plug station 34 does not provide charging energy similar to known DC fast-charging (DCFC) stations. The quick-plug station 34 provides necessary power transfer equipment to regulate the energy transfer between the first BEV 12 and the second BEV 22. At the quick-plug station 34, a charging cable 36 set provided by the quick-plug station 34 and supplemented as necessary by a charging jumper cable provided by at least one of the first BEV 12 or the second BEV 22 is connected to the vehicles and the quick-plug station 34. Energy transfer from the first BEV 12 to the second BEV 22 is thereby initiated. Control equipment described in reference to FIG. 3 in a charging adapter of the first BEV 12 or the second BEV 22 controls the energy transfer until the full amount of the requested energy level 28 is transferred.

As a second option a second charging operation 32 is performed by initially using the first vehicle position 20 and the second vehicle position 30 to calculate an optimum common location 40 for both vehicles and directing the first BEV 12 and the second BEV 22 to the common location 40. Upon arrival at the common location 40, a jumper cable 42 provided by one of the first BEV 12 or the second BEV 22 is connected between the first battery system 18 of the first BEV 12 and the second battery system 26 of the second BEV 22. Control equipment described in reference to FIG. 2 in a charging adapter of the first BEV 12 or the second BEV 22 controls the energy transfer until the full amount of the requested energy level 28 is transferred.

As a third option a third charging operation 44 is performed by initially using the first vehicle position 20 and the second vehicle position 30 to calculate an optimum common location 40 and directing both the first BEV 12 and the second BEV 22 to the common location 40. It is noted a BEV 46 may be substituted for the first BEV 12, as the BEV 46 may be for example a commercial vehicle such as a cab, a truck, a van, a for-hire driven vehicle such as an automobile or the like. Upon arrival at the common location 40, a jumper cable 42 provided by one of the first BEV 12 or the BEV 46, or the second BEV 22 is connected between the first battery system 18 of the first BEV 12 or the BEV 46 and to the second battery system 26 of the second BEV 22. Control equipment described in reference to FIG. 2 in a charging adapter of the first BEV 12 or the BEV 46, or in the second BEV 22 controls the energy transfer until the full amount of the requested energy level 28 is transferred. After completion of the energy transfer a payment 48 is electronically passed from funds in a predetermined account of the operator of the second BEV 22 to a predetermined account of the first BEV 12.

Referring to FIG. 2 and again to FIG. 1, an energy transfer portion of the apparatus and method for charging an electric vehicle 10 defining a charging adapter 50 provides for energy transfer between a first plug 52 connected to the energy supplying vehicle defining the first BEV 12 and a second plug 54 connected to the energy receiving vehicle defining the second BEV 22. The charging adapter 50 includes a first energy transfer cable pair 56 connected to the first plug 52 and to a bi-directional buck boost converter 58 which provides for matching of the electrical system voltage and battery power of the first BEV 12 to the electrical system voltage and battery power of the second BEV 22. The bi-directional buck boost converter 58 is connected to the second plug 54 using a second energy transfer cable pair 60. According to several aspects the bi-directional buck boost converter 58 defines a vehicle-to-vehicle (V2V) bidirectional buck boost converter having a plurality of phases that generate interleaved currents thereby reducing filtering requirements.

A controller 62 of the charging adapter 50 provides for communication between the first plug 52 and the second plug 54. According to several aspects the controller 62 may communicate with either a vehicle controller or a command center remote from the automobile vehicle, or both the vehicle controller and the command center simultaneously. The controller 62 allows for monitoring energy analyses and control of energy transfer between the first BEV 12 and the second BEV 22. A communication link 64 connects the first plug 52 to the controller 62, and a vehicle-to-vehicle link 66 connects the controller 62 to the second plug 54.

Figure 2:
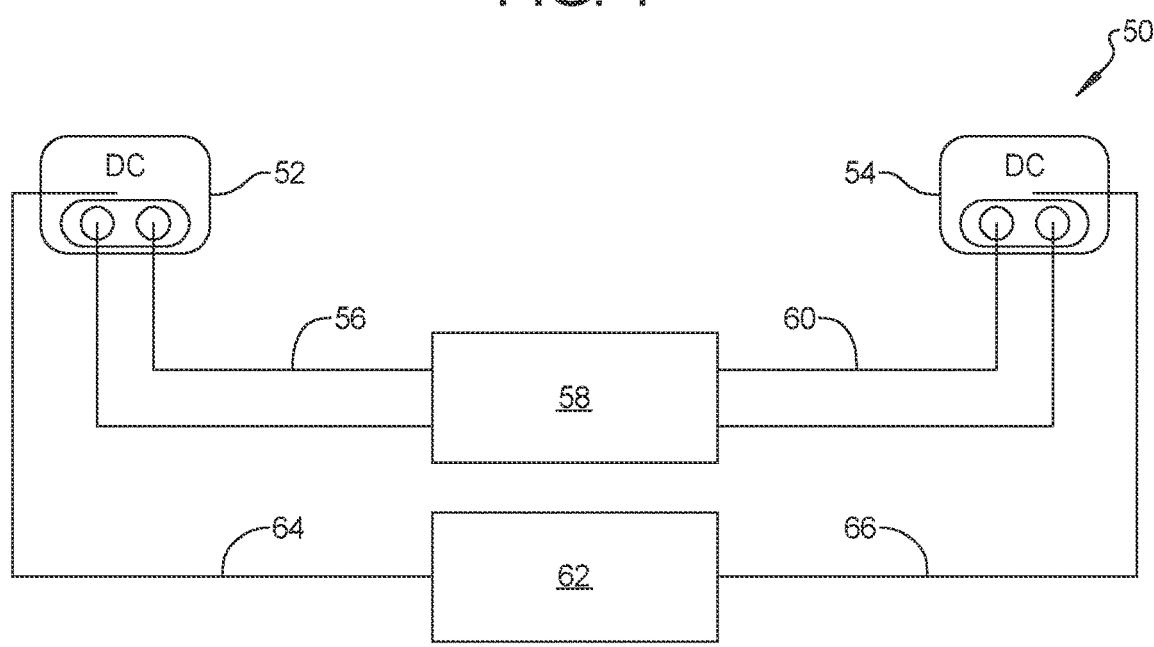
FIG. 2 is a diagrammatic view of a charging adapter of the apparatus of FIG. 1.

Referring to FIG. 3 and again to FIG. 2, a charging portion of the apparatus and method for charging an electric vehicle 10 defining a vehicle-to-vehicle (V2V) charging controller 68 may be connected to the first BEV 12 and the second BEV 22 using the charging cable 36 or the jumper cable 42. The V2V charging controller 68 is equipped for wireless communication of the data necessary for identifying the battery system charge state of the first BEV 12 and the battery system charge state of the second BEV 22. The V2V charging controller 68 may be a standard or an optional component provided with one or both of the first BEV 12 and the second BEV 22. According to several aspects the V2V charging controller 68 includes a single-phase V2V bi-directional converter. The single-phase V2V bi-directional converter may include a single-phase V2V charging circuit 70 for transferring energy from a first battery pack 72 of the first BEV 12 to a second battery pack 74 of the second BEV 22.

According to several aspects, the V2V charging controller 68 may include a heat removal device 75 which according to several aspects may define a fan or a combination of fans/heat sinks located on a surface of V2V bi-directional converter to remove heat from the V2V bi-directional converter. According to several aspects the V2V charging controller 68 and the single-phase V2V charging circuit 70 are adapted for an operational voltage range from 150 VDC up to approximately 1200 VDC.

Referring to FIG. 4 and again to FIG. 3, according to several aspects the V2V charging controller 68 includes a two-phase V2V bi-directional converter. The two-phase V2V bi-directional converter may include a two-phase V2V charging circuit 76 for transferring energy from a first battery pack 78 of the first BEV 12 to a second battery pack 80 of the second BEV 22. According to several aspects the V2V charging controller 68 and the two-phase V2V charging circuit 76 are adapted for an operational voltage range from 150 VDC up to approximately 1200 VDC.

Referring to FIG. 5 and again to FIGS. 3 and 4, according to several aspects the V2V charging controller 68 includes a multiple-phase V2V bi-directional converter. The multiple-phase V2V bi-directional converter includes a multiple-phase V2V charging circuit 82 which may define a three-phase V2V charging circuit for transferring energy from a first battery pack 84 of the first BEV 12 to a second battery pack 86 of the second BEV 22. According to several aspects the V2V charging controller 68 and the multiple-phase V2V charging circuit 82 are adapted for an operational voltage range from 150 VDC up to approximately 1200 VDC.

With continuing reference to FIGS. 3, 4 and 5 the single-phase V2V charging circuit 70, the two-phase V2V charging circuit 76 and the three-phase V2V charging circuit 82 may be cooled by the addition of a cooling feature such as cooling fins (not shown) or a self-contained thermal management system such as the heat removal device 75.

Referring to FIG. 6 and again to FIGS. 1 through 5, a system flow diagram 88 identifies exemplary method steps performed by the system 10 of the present disclosure. In a start step 90, the customer or operator of the second BEV 22 desiring an energy charge for the second BEV 22 initiates operation of the system. In an identification step 92 the customer then enters a number of miles of travel needed 94 and a customer available charging time 96, for example a time in minutes.

In a computation step 98, the system controller 62 computes an amount of energy necessary 100 for charging the second battery system 26 of the second BEV 22 based on the number of miles of travel needed 94. The amount of energy necessary 100 is based in part on the parameters of the second battery system 26 of the second BEV 22, including a battery voltage 102, a battery charge state 104 and an available charge rate 106.

In a communication step 108, the system controller 62 wirelessly identifies available quick-plug options based on a location of the second vehicle 110, an energy supply 112 from one or more available charging options to the second BEV 22, and availability of a charging connector 114. The system controller 62 pings the available charging options. According to several aspects, the available charging options may include a quick-plug dispenser 116 option, a customer-to-customer 118 option, a customer-to-business 120 option and a business-to-customer 122 option.

For the quick-plug dispenser 116 option a number of available charging plugs 124 is identified. In addition, a quantity of charging slots 126 that are available is also identified. According to several aspects a quick-plug dispenser for the quick-plug dispenser 116 option can be a charging junction box or a dispenser providing a cable upon request for a predetermined amount per hour or per day.

For the customer-to-customer 118 option the location of the second vehicle 110 relative to a location 128 of one or more available charge available vehicles 130 such as the first BEV 12 and a battery status 132 of the charge available vehicles 128 are identified.

For the customer-to-business 120 option the location of the second vehicle 110 relative to the location 128 of one or more available charge available vehicles 130 such as the first BEV 12 and a business energy need 134 are identified.

For the business-to-customer 122 option the location of the second vehicle 110 relative to the location 128 of one or more available charge available vehicles 130 such as the first BEV 12 and the battery status 132 of the charge available vehicles 130, as well as a target price 136 of the available energy are identified.

The results of the communication step 108 are wirelessly transmitted in a transmission step 138 into the plug command center 14. The quick-plug command center 14 is available to customers who elect to subscribe to the apparatus and method for charging an electric vehicle 10. The quick-plug command center 14 provides processing capability for the following processing and computation steps.

In a processing step 140 the quick-plug command center 14 identifies an optimal energy source for the customer vehicle 142 which is based on the target price 136 of the available energy, the customer available charging time 96, an availability of both the second BEV 22 and the one or more available charging options 116, 118, 120 122, as well as further features. During the processing step 140 multiple computations are also performed to identify a charge completion time 144, a charging price 146, a CO2 footprint 148, and similar items.

In a transfer step 150 results of the processing step 140 defining quick-plus charging options are transferred to the second BEV 22 to request a customer approval or disapproval if a charging operation is to be conducted.

In a customer approval step 152, the customer in the second BEV 22 either approves or disapproves with continuing with a charging operation. If during the approval step 152 an approval defined by an approval signal 154 is sent, which initiates a dispatch approved quick-plug method 156. If during the approval step 152 a disapproval defined by a disapproval signal 158 is sent, in a return step 160 the program returns to a main input menu for the customer of the second BEV 22 to input a new set of preferences.

The charging adapter 50 includes the compact buck-boost DC-DC converter 58 and the system controller 62. The V2V charging controller 68 facilitates the peer-to-peer (P2P) charging event. The buck-boost DC-DC converter 58 is a high efficiency DC-DC converter rated up to 100 kW and up to 1200 VDC, is coupled with advanced cooling techniques such as a self-contained thermal management system.

The system controller 62 provides communication with multiple vehicles and authenticates a request from the second BEV 22 and manages a charging event for transferring energy from a host vehicle defining the first BEV 12 to the customer vehicle defining the second BEV 22.

According to several aspects, the system controller 62 and the V2V charging controller 68 may include one or more processors, which in exemplary aspects are microprocessors. The processors in exemplary aspects may reside in a computer independent of the system controller 62 or the V2V charging controller 68, or in the cloud. The processors may perform distributed or parallel processing protocols and may include, for example, application specific integrated circuits, a programmable gate array including a field programmable gate array, a digital-signal processor, or a front-end processor. The processors may also include or access information stored in a memory with which the processors are individually operatively coupled. Memory is understood as a physical device capable of storing information temporarily, such as in the case of random-access memory, or permanently, such as in the case of read-only memory. Representative physical devices include hard disk drives, solid state drives, optical discs, or storage accessible through the cloud over networks.

The two-way technology platform of the present disclosure facilitates charging via identification of an optimal method of charging. A charging adapter consists of an ultra-compact bi-directional DC-DC converter and smart charge controls. The system of the present disclosure dynamically evaluates charging methods via data mining vehicle information and customer preferences in real-time.

An apparatus and method for charging an electric vehicle 10 of the present disclosure offers several advantages. These include a technology platform and charging adapter that enables peer-to-peer vehicle charging. This unlocks the potential BEV customer base in the absence of a ubiquitous charging station availability and creates new revenue streams.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An apparatus for charging an electric vehicle, comprising:
 a plug command center located in a cloud including application software and having data identifying an availability of an amount of energy which is available for transfer from a first battery system of a first battery electric vehicle (BEV) to a second BEV;

a charging adapter providing for energy transfer between a first plug of the first BEV and a second plug of the second BEV; and a vehicle-to-vehicle (V2V) charging controller having charge management algorithms integrated either with a dc-dc converter or in an automobile vehicle communicating data identifying a first battery system charge state of the first BEV and a second battery system charge state of the second BEV and selecting between multiple charging options, wherein the multiple charging options include a quick-plug dispenser option connecting the first BEV and the second BEV to a quick-plug dispenser, the quick-plug dispenser provided in a charging junction box or in a dispenser having a cable upon request for a predetermined amount per hour or per day.

2. The apparatus for charging the electric vehicle of claim 1, wherein for the quick-plug dispenser option a number of available charging plugs is identified and a quantity of charging slots available is identified.

3. The apparatus for charging the electric vehicle of claim 1, wherein the multiple charging options include a customer-to-customer option directly connecting the first BEV to the second BEV using the charging adapter defining a charging cable having the dc-dc converter provided by one of the first BEV or the second BEV connected between the first battery system of the first BEV and the second battery system of the second BEV.

4. The apparatus for charging the electric vehicle of claim 3, wherein the customer-to-customer option further includes a location of the second BEV relative to a location of one or more available charge available vehicles including the first BEV and a battery status of the charge available vehicles.

5. The apparatus for charging the electric vehicle of claim 3, further including control equipment of the charging adapter provided with one of the first BEV or the second BEV controls an energy transfer until a full amount of a requested energy level is transferred from the first BEV to the second BEV.

6. The apparatus for charging the electric vehicle of claim 1, wherein the multiple charging options include a customer-to-business option identifying a location of the second BEV relative to a location of one or more available charge available vehicles including the first BEV and identifying a business energy need.

7. The apparatus for charging the electric vehicle of claim 1, wherein the multiple charging options include a business-to-customer option including a location of the second BEV relative to a location of one or more available charge available vehicles including the first BEV, a battery status of the charge available vehicles, and a target price of the amount of energy which is available.

8. The apparatus for charging the electric vehicle of claim 1, wherein the charging adapter defines a bi-directional buck boost converter matching an electrical system voltage and a battery power of the first BEV to an electrical system voltage and a battery power of the second BEV.

9. The apparatus for charging the electric vehicle of claim 1, wherein the V2V charging controller is adapted for an operational voltage range between 150 VDC up to approximately 1200 VDC and includes charging controls and one of:

a single-phase V2V bi-directional converter;
a two-phase V2V bi-directional converter;
a three-phase V2V bi-directional converter; and
a multiple-phase V2V bi-directional converter.

10. An apparatus for charging an electric vehicle, comprising:

a charging adapter providing energy transfer by a first plug connected to an energy supplying vehicle and a second plug connected to an energy receiving vehicle;

a bi-directional buck boost converter matching an electrical system voltage and a battery power of the energy supplying vehicle to an electrical system voltage and a battery power of the energy receiving vehicle;

a controller communicating between the first plug and the second plug and selecting between multiple available charging options; and the charging adapter including:
a first energy transfer cable pair connected to the first plug and to the bi-directional buck boost converter; and
a second energy transfer cable pair connecting the bi-directional buck boost converter to the second plug, wherein the bi-directional buck boost converter defines a vehicle-to-vehicle (V2V) bidirectional buck boost converter having a plurality of phases that generate interleaved currents thereby reducing filtering requirements.

11. The apparatus for charging the electric vehicle of claim 10, further including:

a communication link connecting the first plug to the controller;

a vehicle-to-vehicle link connecting the controller to the second plug; and a plug command center providing processing capability to identify an optimal energy source for the energy receiving vehicle based on a target price of an amount of energy available from the energy supplying vehicle and an energy receiving vehicle available charging time; and wherein the controller monitors an energy analysis and controls energy transfer between the energy supplying vehicle and the energy receiving vehicle.

12. The apparatus for charging the electric vehicle of claim 11, further including:

a first vehicle position defining a GPS coordinate position of the energy supplying vehicle automatically communicated to the plug command center;

a low-energy state in a battery system of the energy receiving vehicle pinged by the energy receiving vehicle to the plug command center; and a second vehicle position defining a GPS coordinate position of the energy receiving vehicle automatically communicated to the plug command center.

13. The apparatus for charging the electric vehicle of claim 12, further including an optimum common location for the energy supplying vehicle and the energy receiving vehicle, the optimum common location calculated by the plug command center using the first vehicle position and the second vehicle position, the plug command center further directing the energy supplying vehicle and the energy receiving vehicle to the optimum common location.

14. The apparatus for charging the electric vehicle of claim 13, further including:

a first battery system of the energy supplying vehicle; and
a second battery system of the energy receiving vehicle; and wherein the charging adapter is connected between the first battery system of the energy supplying vehicle and the second battery system of the energy receiving vehicle at the common location.

15. The apparatus for charging the electric vehicle of claim 10, wherein the multiple available charging options include:
- a quick-plug dispenser option connecting the energy supplying vehicle and the energy receiving vehicle to a quick-plug dispenser;
- a customer-to-customer option using a cable provided by one of the energy supplying vehicle or the energy receiving vehicle connected between a first battery system of the energy supplying vehicle and a second battery system of the energy receiving vehicle;
- a customer-to-business option identifying a location of the energy receiving vehicle relative to a location of one or more available charge available vehicles including the energy supplying vehicle and identifying a business energy need; and
- a business-to-customer option including the location of the energy receiving vehicle relative to the location of one or more available charge available vehicles including the energy supplying vehicle, a battery status of the charge available vehicles, and a target price of an amount of energy available from individual ones of the one or more available charge available vehicles; and
- wherein a payment is electronically processed after completion of the energy transfer from funds in an energy receiving vehicle predetermined account to an energy supplying vehicle predetermined account.

16. The apparatus for charging the electric vehicle of claim 10, wherein the V2V buck boost converter is adapted for an operational voltage range between 150 VDC up to approximately 1200 VDC.

17. The apparatus for charging the electric vehicle of claim 16, wherein the V2V buck boost converter includes charging controls and one of:
- a single-phase V2V bi-directional converter;
- a two-phase V2V bi-directional converter;
- a three-phase V2V bi-directional converter; and
- a multiple-phase V2V bi-directional converter.

18. The apparatus for charging the electric vehicle of claim 10, wherein the multiple charging options include a business-to-customer option including a location of the energy receiving vehicle to a location of the energy supplying vehicle, a battery status of the energy supplying vehicle, and a target price of an amount of energy which is available.

19. A method for charging an electric vehicle, comprising:
- identifying an availability of an amount of energy available for transfer from a first battery system of a first battery electric vehicle (BEV) to a second BEV using a plug command center;
- performing one of:
  - connecting the first BEV and the second BEV to a quick-plug dispenser; and
  - connecting the first BEV to the second BEV using a jumper cable provided by one of the first BEV or the second BEV; and
  - matching a first electrical system voltage and a first battery power of the first BEV to a second electrical system voltage and a second battery power of the second BEV using a bi-directional buck boost converter
- providing for energy transfer between a first plug of the first BEV and a second plug of the second BEV using a charging adapter;
- communicating data identifying a first battery system charge state of the first BEV and a second battery system charge state of the second BEV using a V2V charging controller; and
- selecting between multiple available charging options.

20. The method of claim 19, further including operating the plug command center and:
- calculating a common location for the first BEV and the second BEV using a first vehicle location and a second vehicle location; and
- directing the first BEV and the second BEV to the common location.

* * * * *